United States Patent [19]

Shima

[11] Patent Number: 4,809,327
[45] Date of Patent: Feb. 28, 1989

[54] ENCRTPTION OF MESSAGES EMPLOYING UNIQUE CONTROL WORDS AND RANDOMLY CHOSEN ENCRYPTION KEYS

[75] Inventor: George T. Shima, Tokyo, Japan

[73] Assignee: Unisys Corporation, Detroit, Mich.

[21] Appl. No.: 98,723

[22] Filed: Sep. 14, 1987

Related U.S. Application Data

[63] Continuation of Ser. No. 902,743, Sep. 2, 1986, abandoned.

[51] Int. Cl.[4] .............................................. H04L 9/04
[52] U.S. Cl. ...................................... 380/44; 380/21; 380/47; 380/48; 380/50
[58] Field of Search ................................ 380/43–50, 380/21, 20, 28

[56] References Cited

U.S. PATENT DOCUMENTS

| | | | |
|---|---|---|---|
| Re. 29,259 | 7/1977 | Sabsay | 380/23 |
| Re. 30,679 | 7/1981 | Evans et al. | 364/523 |
| 4,176,246 | 11/1979 | Gaetzi | 178/22.13 |
| 4,193,121 | 3/1980 | Fedida et al. | 365/78 |
| 4,268,859 | 5/1981 | Ost | 380/20 |
| 4,306,111 | 12/1981 | Lu et al. | 178/22.10 |
| 4,365,110 | 12/1982 | Lee et al. | 178/22.10 |
| 4,369,332 | 1/1983 | Campbell, Jr. | 178/22.18 |
| 4,379,206 | 4/1983 | Aoki | 178/22.13 |
| 4,429,180 | 1/1984 | Unkenholz | 178/22.17 |
| 4,558,176 | 12/1985 | Arnold et al. | 380/28 |
| 4,575,583 | 3/1986 | Kartalopoulos | 364/200 |
| 4,584,673 | 4/1986 | Kuijk | 365/78 |
| 4,592,019 | 5/1986 | Huang et al. | 365/78 |
| 4,605,820 | 8/1986 | Campbell, Jr. | 380/45 |
| 4,607,137 | 8/1986 | Jansen et al. | 380/45 |
| 4,668,103 | 5/1987 | Wilson | 380/44 |

FOREIGN PATENT DOCUMENTS 2288428 5/1976 France .
2068691 8/1981 United Kingdom .

OTHER PUBLICATIONS

IBM Tech. Disclosure Bull., vol. 24, No. 1B, (6/81) pp. 559–560, Lennon et al., "Isolation of Cryptographic Functions via Operation Sub-Keys".
"Cipher Systems", by Beker et al., 1982.

Primary Examiner—Salvatore Cangialosi
Attorney, Agent, or Firm—Charles J. Fassbender; L. Joseph Marhoefer

[57] ABSTRACT

In a communication network, a transmitting station sends encrypted messages for selective decryption in any one of several receiving stations. To that end, the transmitting station stores a single set of several encryption keys, each of which is for encrypting messages to all of the receiving stations. Also, for each message that is sent for decryption in a particular receiving station, the transmitting station (a) automatically selects at random any encryption key from the single set, (b) receives, from an input terminal, a control word which is a series of bits that uniquely identifies the particular receiving station, (c) encrypts both the message and the control word with the randomly selected key, and (d) transmits the result of step (c) to all of the receiving stations.

12 Claims, 4 Drawing Sheets

ENCRTPTION OF MESSAGES EMPLOYING UNIQUE CONTROL WORDS AND RANDOMLY CHOSEN ENCRYPTION KEYS

This is a continuation of applicatoin Ser. No. 902,743 filed on Sept. 2, 1986 now abandoned.

BACKGROUND OF THE INVENTION

This invention relates to methods of communicating via encrypted messages from one station to another on a communication network, and to circuits for implementing such communication methods.

Basically, a communication network of the type with which this invention is concerned includes at least one station which accepts messages from an operator, and which encrypts and transmits those messages; and it includes at least another station which receives the encrypted messages, decrypts them, and provides the decrypted message to an operator. Such networks are useful wherever proprietary information needs to be transmitted. For example, the proprietary information might include a recommendation from a broker to a client to purchase or sell certain stock, an electronic transfer of funds, military-related data, etc.

Typically, each person at the receiving station who is to receive a message has his own unique key, and the operator at the transmitting station has all such keys. Then, to encrypt a message for a particular person, the transmitting station uses the key which is assigned to that person.

In other words, in order to communicate between stations, certain individuals at both the transmitting station and the receiving station must "know" what the encryption/decryption key is. No one else can have access to the key, for if they do, they can monitor the encrypted message on the network and decrypt it. This, however, presents the problem of how to secretively transport the keys between the stations.

Also, it is desirable in the above described communications networks to use relatively long keys to encrypt and decrypt each message. This is because, in general, the degree of security which an encrypted message is given is proportional to the length of the key that is used to encrypt the message. However, long keys also require a large number of memory cells for their storage. For example, one million keys which are each one million bits long would require one billion storage cells, and that is impractical to achieve with today's technology.

Accordingly, a primary object of this invention is to provide a communication network which encrypts, transmits, and decrypts messages from one station to another without ever having to secretively transport encryption/decryption keys between the stations.

Another primary object of the invention is to provide a communication network in which messages are encrypted and decrypted with large numbers of long encryption/decryption keys without ever having to provide a large number of storage cells for those keys.

BRIEF SUMMARY OF THE INVENTION

In a communication network, a transmitting station sends encrypted messages for selective decryption in any one of several receiving stations. To that end, the transmitting station stores a single set of several encryption keys, each of which is for encrypting messages to all of the receiving stations. Also, for each message that is sent for decryption in a particular receiving station, the transmitting station (a) automatically selects at random any encryption key from the single set, (b) receives, from an input terminal, a control word which is a series of bits that uniquely identifies the particular receiving station, (c) encrypts both the message and the control word with the randomly selected key, and (d) transmits the result of step (c) to all of the receiving stations.

BRIEF DESCRIPTION OF THE DRAWINGS

Various features and advantages of the invention are described herein in detail in conjunction with the accompanying drawings wherein.

DETAILED DESCRIPTION OF THE INVENTION

Figure 1:
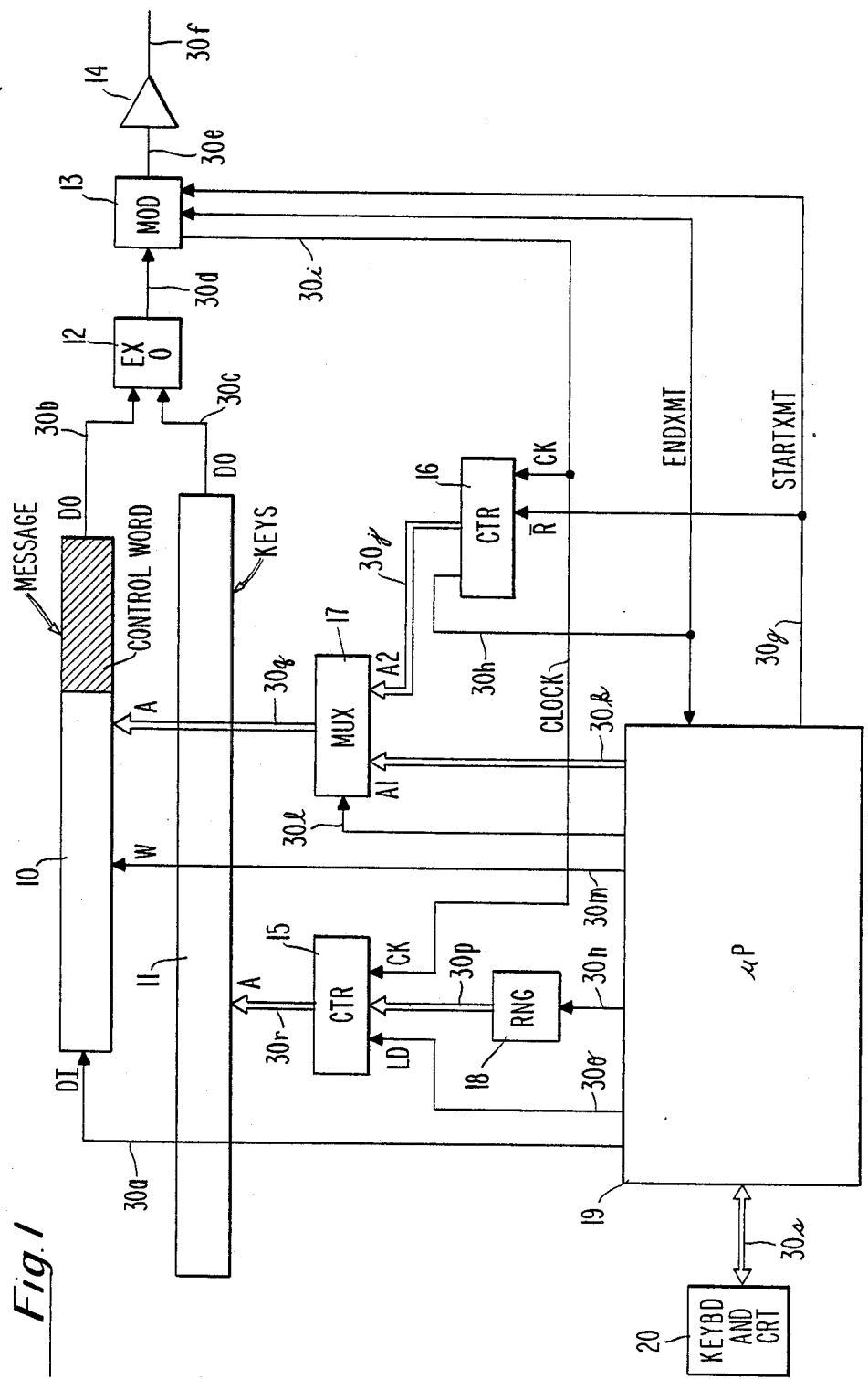
FIG. 1 is a detailed logic diagram of a station which receives, encrypts, and transmits messages in accordance with the present invention.

A preferred embodiment of a station which encrypts and transmits messages in accordance with the present invention will now be described in detail in conjunction with FIG. 1. This station includes a random access read/write memory 10, a random access read only memory 11, an exclusive OR gate 12, a modulator 13, a transmitter 14, a pair of counters 15 and 16, a multiplexor 17, a random number generator 18, a microprocessor 19, and a keyboard/CRT 20. All of these components are interconnected as illustrated via conductors 30a thru 30s.

Memory 10 holds the messages which are to be encrypted and transmitted. It is 1 bit wide and N bits long, where N is any integer which is large enough to allow the memory to hold each message individually. Memory 10 has a single data input terminal DI, a single data output terminal DO, a single write control terminal W, and binary address terminals A.

Memory 11, by comparison, holds all of the keys which are utilized to encrypt the messages from memory 10. It is 1 bit wide and M bits long, where M is any number which is large enough to allow the memory to store all of the encryption keys at the same time. How this is achieved without making memory 11 excessively large will be described shortly in conjunction with FIG. 3. Memory 11 has a single data output terminal DO, and binary address termianls A.

Some of the other components also have their terminals labeled as follows. Multiplexor 17 has input terminals A1 and A2. Address signals on terminals A1 and A2 respectively pass through the multiplexor when the control signal on conductor 301 is high and low. Counter 16 has a reset terminal $\overline{R}$ and a clock terminal CK; and counter 15 has a load data terminal LD and a clock terminal CK. When terminal $\overline{R}$ receives a low signal, counter 16 resets; when terminal CK receives a clock pulse, counters 15 and 16 increment by one; and when terminal LD receives a pulse, counter 15 loads a random number from generator 18.

Figure 2:
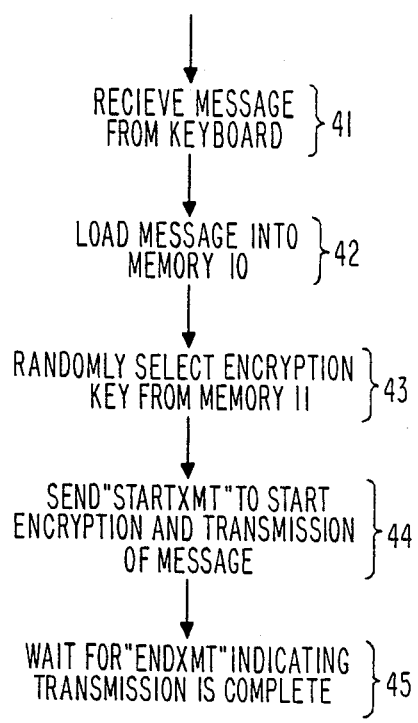
FIG. 2 is a flow chart of a program in a microprocessor in FIG. 1 which controls its operation.

Turning now to FIG. 2, a program in microprocessor 19 which controls the sequence by which the above circuitry operates to encrypt and transmit a message will be described. Initially, as indicated by reference numeral 41, the program waits for a message that is to be encrypted and transmitted. This message is received by microprocessor 19 from keyboard 20, and it must include a control word.

Preferably, each control word is chosen such that it has some secondary meaning to the person for whom the message is intended (i.e., a meaning other than an abstract sequence of one and zero bits). For example, the control words can be selected from a large set of data that is personal to the individual for whom a message is intended, such as his Social Security number, his license plate number, his home address, etc.

From microprocessor 19, as indicated by reference numeral 42, the message is loaded into memory 10. To achieve this, microprocessor 19 forces the signal on conductor 30l to a high state, generates a sequence of consecutive addresses on the conductors 30k, and it generates the bits of the message on conductor 30a and write pulses on conductor 30m in synchronization with the addresses.

Subsequently, as indicated by reference numeral 43, microprocessor 19 randomly selects an encryption key from memory 11. To achieve this, microprocessor 19 sends a pulse on conductor 30n to generator 18; and in response, signals representing a random number are generated on the conductors 30p. Microprocessor 19 then sends a pulse on conductor 30o which causes the random number on the conductors 30p to be loaded into counter 15. By this means, a beginning address for memory 11 is randomly selected.

Now in order to save memory space, the keys in memory 11 are not stored separate from one another. Instead, all of the keys are stored as a single circular sequence of bits; and each bit of this sequence is a bit of many different keys. This circular sequence is illustrated schematically in FIG. 3.

In that figure, reference numeral 50-1 indicates the cell in memory 11 which has address 0, reference numeral 50-2 indicates the cell in memory 11 which has address 1, ... , and reference numeral 50-M indicates the cell in memory 11 which has address M-1. To select a key, one of these cells is addressed initially in a random fashion as described above. Thereafter, the cells are addressed by counter 15 by adding one to the previous address in sequential fashion until cell 50-M is addressed. Then the next cell that is addressed by counter 15 is cell 50-1. Then the cells are addressed by adding one to the previous address in a sequential fashion until cell 50-M is again reached, at which time the whole sequence repeats itself.

Figure 3:
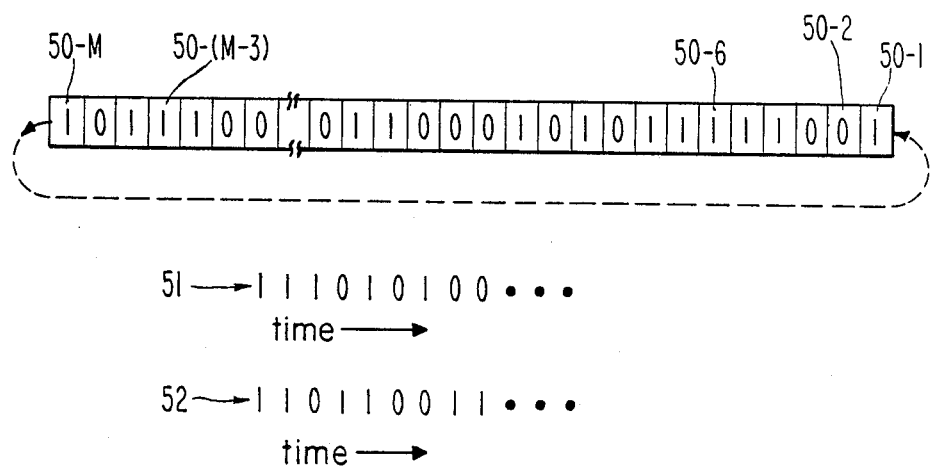
FIG. 3 is a schematic diagram showing how encryption keys are stored in a memory in FIG. 1.

For example, if memory 11 contains the bit pattern which is shown in FIG. 3 and cell 50-6 is initially addressed, then the encryption key would be 111010... as indicated by reference numeral 51 in FIG. 3. As another example, if the initial address in counter 15 selects cell 50-(M-3), then the encryption key, as indicated by reference numeral 52, would be 11011001..., etc. In other words, the key which is utilized to encrypt a message is the circular sequence of bits which is stored in memory 11 beginning at a cell which is randomly selected.

To activate an actual encryption and transmission process, microprocessor 19 simply forces signal STARTXMT on conductor 30g to a high state. This is indicated by reference numeral 44 in FIG. 2. In response, modulator 13 starts sending CLOCK pulses on conductor 30i. Each CLOCK pulse on conductor 30i causes one bit of the message in memory 10 and one bit of the selected key in memory 11 to be exclusively ORed, and the result is modulated by modulator 13 and transmitted by transmitter 14.

After sending the STARTXMT signal, microprocessor 19 waits for signal ENDXMT on conductor 30h to go high. This is indicated by reference numeral 45 in FIG. 2. Signal ENDXMT is forced high by counter 16 after it has reached a certain count which indicates that the entire message in memory 10 has been encrypted and transmitted. When that occurs, microprocessor 20 returns to its quiescent state by forcing signal STARTXMT low.

Figure 4:
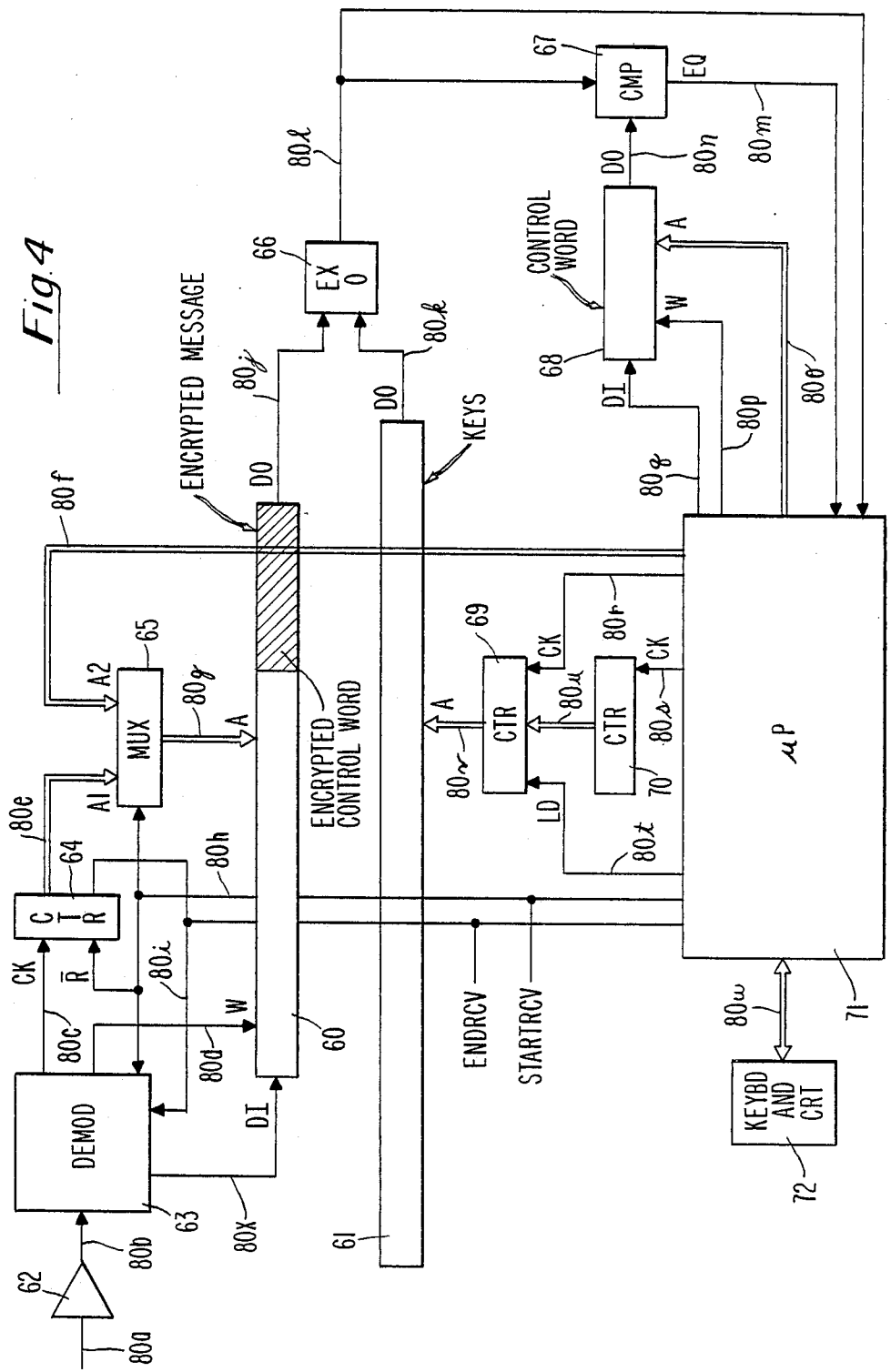
FIG. 4 is a detailed logic diagram of a station which receives and decrypts messages in accordance with the present invention.

Reference should now be made to FIG. 4, wherein a preferred embodiment of a station which receives and decrypts messages in accordance with the invention is illustrated. This station includes a random access read/write memory 60, a random access read only memory 61, a receiver 62, a demodulator 63, a counter 64, a multiplexor 65, an exclusive OR gate 66, a comparator 67, a random access read/write memory 68, a pair of counters 69 and 70, a microprocessor 71, and a keyboard/CRT 72. All of these components are interconnected via conductors 80a through 80w as illustrated.

Memory 60 stores the encrypted messages which are received for decryption, and it has the same structure as memory 10 of the FIG. 1 station. Memory 61 stores the keys that are utilized to decrypt the messages in memory 60, and it has the same structure and stored bit pattern as memory 11 of the FIG. 1 station.

Other components in FIG. 4 which have various control terminals that are labeled include: counter 64 which has a reset terminal $\overline{R}$ and clock terminal CK, counter 69 which has a load terminal LD and a clock terminal CK, and counter 70 which has a clock terminal CK. Also, multiplexor 65 has two sets of input terminals A1 and A2; and memory 68 has a single data input terminal DI, a single data output terminal DO, a single write terminal W, and binary address terminals A. Signals on those terminals cause the same operations as described for correspondingly labeled terminals in FIG. 1.

Figure 5:
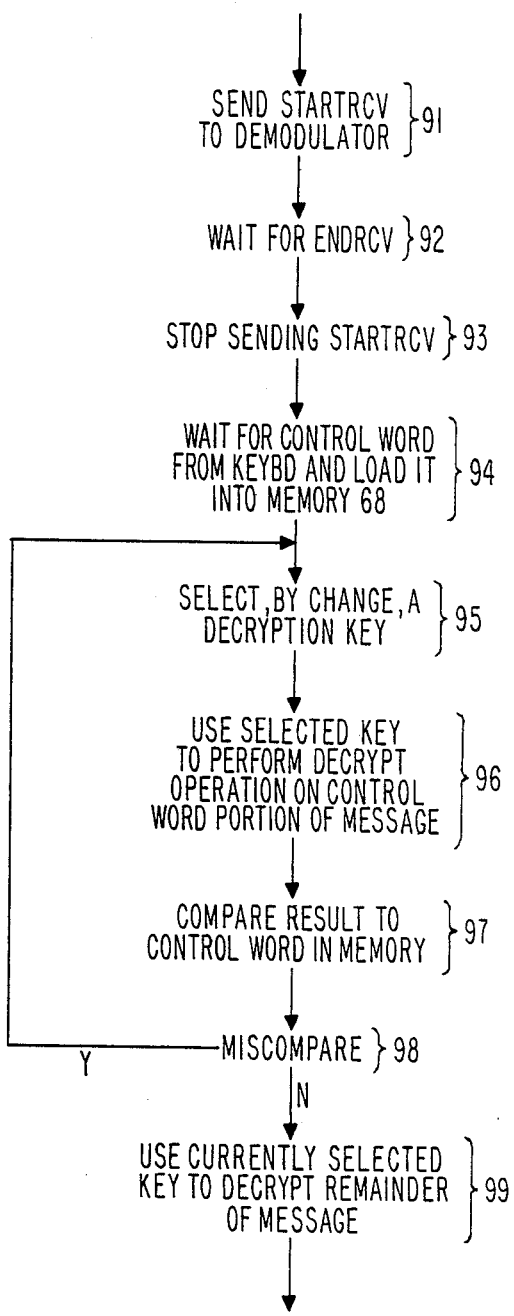
FIG. 5 is a flow chart of a program in a microprocessor in FIG. 4 which controls its operation.

Consider now FIG. 5 which shows a high level flow chart of a program in microprocessor 71. This program controls the sequence by which the FIG. 4 circuitry operates to receive and decrypt a message. To begin, as indicated by reference numeral 91, microprocessor 71 forces a STARTRCV signal on conductor 80h to a high level. In response, demodulator 63 receives the next message which passes through receiver 62. As that message is received, demodulator 63 sequentially generates the bits of the message on conductor 80x; and in synchronization with those bits it generates write pulses on conductor 80d and clock pulses on conductor 80c.

In response to each of the clock pulses on conductor 80c, counter 64 counts up by one; and the signals from the output of counter 64 are passed through multiplexor 65 to address memory 60. Thus the bits of an encrypted message are sequentially loaded into memory 60 at consecutively addressed cells beginning at address 0. When the message is completely loaded, counter 64 forces an ENDRCV signal on conductor 80i to a high state which causes demodulator 63 to stop sending the pulses on conductors 80c and 80d.

A high state of signal ENDRCV on conductor 80i is also detected by microprocessor 71 as an indication that a message has been received. This is indicated by reference numeral 92 in FIG. 5. In response, as indicated by reference numeral 93, microprocessor 71 forces signal STARTRCV on conductor 80h to a low state; and this returns demodulator 63 to its quiescent state and resets counter 64.

Next, microprocessor 72 waits for an operator to enter a control word from keyboard 72. This control word, as indicated by reference numeral 94, is then loaded by microprocessor 71 into memory 68. Such loading is achieved by sequentially sending the bits of the control word on conductor 80q in synchronization with addresses on conductors 80o and write pulses on conductor 80p.

Thereafter, as indicated by reference numeral 95, microprocessor 71 selects by chance a decryption key from memory 61. To do this, microprocessor 71 sends a pulse on conductor 80s which causes whatever count is in counter 70 to increment by one; and then, it sends a pulse on conductor 80t which causes the content of counter 70 to be loaded into counter 69.

Next, as indicated by reference numeral 96, microprocessor 71 uses the selected key to perform a decryption operation on the control word portion of the message. To do this, microprocessor 71 sequentially addresses the bits of encrypted control word in memory 60 via the conductors 80f; and in synchronization therewith it sequentially addresses the bits of the selected key by sending clock pulses on conductor 80r. Each address on the conductors 80f and corresponding clock pulse on conductor 80r results in one bit of the encrypted control word being exclusively ORed via gate 66 with one bit of the selected key.

As each exclusive OR signal is produced by gate 66, microprocessor 71 addresses via the conductors 80o the corresponding bit of the control word in memory 68; and these signals from gate 66 and memory 68 are compared via comparator 67. Microprocessor 71 monitors the result of each compare operation on conductor 80m. This is indicated in FIG. 5 by reference numeral 97.

If a miscompare occurs, a new key is selected. This achieved by sending a pulse on conductor 80s and followed by a pulse on conductor 80t. Counters 69 and 70 are constructed such that they increment by one for each pulse that is received on their CK terminal until they address the last cell 50-M, and then the next pulse on their CK terminal causes their count to recycle back to zero.

By proceeding in the above fashion, eventually a key will be selected for which no miscompare occurs on any bit of the entire control word. When that happens, then the selected key is utilized to decrypt the remainder of the message. This is indicated in FIG. 5 by reference numerals 98 and 99.

A primary feature of the above described invention is that it enables messages to be transmitted with an added security over the prior art. This is because with the present invention, the keys are selected at random with no human intervention; and no one knows what key is being utilized to encrypt a particular message. Also, no keys have to be secretly carried from a transmitting station to a receiving station; and different keys are utilized to encrypt different messages for the same individual.

Yet another feature of the present invention is that it enables the large number of encryption and decryption keys to be stored in a small number of memory cells. For example, if memory 11 of FIG. 1 and memory 60 of FIG. 4 are each one bit wide and one million bits long, then, with present technology, they can each be implemented via a single semiconductor chip. Memories 11 and 60 will each then store one million keys which are each one million bits long. By comparison, to store those same keys separate from one another would require one million chips, which is totally impracticable.

A method of communicating via encrypted messages in accordance with the invention, as well as circuitry for carrying out that method, have now been described in detail. In addition, however, many changes and modifications can be made to these details without departing from the nature and spirit of the invention.

For example, counters 15 of FIG. 1 and 69 of FIG. 4 have been described as counting up by one in order to address consecutive bits of the keys. However, those counters 15 and 69 could alternatively count down by one to address consecutive bits of the keys. In that case, when they reach a count of zero, they would recycle on the next CK pulse to address cell M as previously defined.

Also, as described above and as shown in FIGS. 1 and 4, the control word portion of each message is fixed at the beginning of the message. However, as an alternative, the control word can be located at the end of the message or at any other location within the message.

Accordingly, since many such changes and modifications can be made to what has been described above, it is to be understood that the invention is not limited to those details but is defined by the appended claims.

What is claimed is:

1. For use in a communication network of the type in which a transmitting station send an encrypted message to a plurality of receiving stations in a manner that enables only a selected receiving station in said plurality to decrypt the message, a method of operating said transmitting station including the steps of:
   storing in said transmitting station, a single set of several encryption keys, each of which is for encrypting messages to all of said receiving stations; and
   sending a message for decryption in said selected receiving station by (a) automatically choosing at random any encryption key from said set, (b) appending a control word to said message, with said control word being any series of bits that uniquely identifies said selected receiving station, (c) encrypting both said message and said control word with said randomly selected key, and (d) transmitting the result of step (c) to all of said receiving stations.

2. A method according to claim 1 wherein said single set of several encryption keys is stored as a circular sequence of bits in a memory; and wherein the recited step (a) is performed by picking any bit in said sequence as the first bit of the selected decryption key and reading successive bits of said stored sequence as successive bits of the selected decryption key.

3. A method according to claim 2 wherein to read successive bits of the selected decryption key, the number one is added to an address in said memory of the immediately preceding bit.

4. A method according to claim 2 wherein to read successive bits of the selected decryption key, the number one is subtracted from an address in said memory of the immediately preceding bit.

5. A method according to claim 1 wherein said control word which is encrypted and transmitted via the recited steps (c) and (d) is transmitted at the start of the message.

6. A method according to claim 1 wherein said control word which is encrypted and transmitted via the recited steps (c) and (d) is transmitted at a predetermined location in said message.

7. For use in a communication network of the type in which a transmitting station sends an encrypted message to a plurality of receiving stations in a manner that enables only a selected receiving station in said plurality to decrypt the message, a module for inclusion within said transmitting station which comprises:

a single set of several encryption keys, each of which is for encrypting messages to all of said receiving stations; and a control circuit which sends a message for decryption in said selected receiving station including (a) a means for automatically choosing at random any encryption key from said set, (b) a means for appending a control word to said message, said control word being any series of bits that uniquely identifies said selected receiving station, (c) a means for encrypting both said message and said control word with said randomly selected key, and (d) a means for transmitting the result produced by said means for encrypting to all of said receiving stations.

8. A module according to claim 7 wherein said set of decryption keys is stored as a circular sequence of bits in a memory; and wherein said means for selecting picks any bit in said sequence at random as the first bit of said decryption key and reads successive bits of said sequence as successive bits of said decryption key.

9. A module according to claim 8 wherein said means for selecting reads successive bits of said decryption key from said memory by adding the number one to an address in said memory of the immediately preceding bit.

10. A module according to claim 8 wherein said means for selecting reads successive bits of said decryption key from said memory by subtracting the number one from an address in said memory of the immediately preceding bit.

11. A module according to claim 7 wherein said control word which is encrypted and transmitted via the means of clauses (c) and (d) is transmitted at the start of the message.

12. A module according to claim 7 wherein said control word which is encrypted and transmitted via the means of clauses (c) and (d) is transmitted at a predetermined location in the message.

* * * * *